(12) United States Patent
Schneider et al.

(10) Patent No.: US 11,453,080 B2
(45) Date of Patent: Sep. 27, 2022

(54) JOINING APPARATUS AND METHOD FOR LOADING A JOINING ELEMENT

(71) Applicant: NEWFREY LLC, New Britain, CT (US)

(72) Inventors: Michael Schneider, Giessen (DE); Hubert Ivo, Giessen (DE); Bettina Fischermanns, Giessen (DE)

(73) Assignee: NEWFREY LLC, New Britain, CT (US)

( * ) Notice: Subject to any disclaimer, the term of this patent is extended or adjusted under 35 U.S.C. 154(b) by 855 days.

(21) Appl. No.: 15/637,498

(22) Filed: Jun. 29, 2017

(65) Prior Publication Data
US 2018/0009056 A1 Jan. 11, 2018

(30) Foreign Application Priority Data

Jul. 6, 2016 (DE) .......................... 102016112372.2

(51) Int. Cl.
*B23K 9/20* (2006.01)
*B23K 37/04* (2006.01)
*B23K 1/005* (2006.01)

(52) U.S. Cl.
CPC ................ *B23K 9/201* (2013.01); *B23K 9/20* (2013.01); *B23K 9/206* (2013.01); *B23K 37/04* (2013.01); *B23K 1/005* (2013.01)

(58) Field of Classification Search
CPC .......... B23K 9/201; B23K 9/20; B23K 9/206; B23K 37/04; B23K 1/005
USPC ..................................................... 219/98, 99
See application file for complete search history.

(56) References Cited

U.S. PATENT DOCUMENTS

| | | | |
|---|---|---|---|
| 3,150,563 A | | 9/1964 | Carrigan et al. |
| 3,854,027 A | * | 12/1974 | Ettinger ............. B23K 11/0053 219/98 |
| 2004/0056005 A1 | * | 3/2004 | Willershausen ....... B23K 9/206 219/98 |

(Continued)

FOREIGN PATENT DOCUMENTS

| | | |
|---|---|---|
| DE | 10018239 C | 10/2001 |
| DE | 102005009950 A | 3/2006 |

(Continued)

OTHER PUBLICATIONS

European Search Report dated Nov. 20, 2017.

*Primary Examiner* — Tu B Hoang
*Assistant Examiner* — Alba T Rosario-Aponte
(74) *Attorney, Agent, or Firm* — Michael P. Leary

(57) ABSTRACT

Joining apparatus for joining joining elements onto workpieces, comprising a joining element holding device, which is configured to radially hold a joining element, and comprising a loading pin arrangement, which is configured to slide a joining element axially into a holding position in the joining element holding device, and/or to axially support the joining element during a joining process, wherein the loading pin arrangement has a loading pin, which is slidable by means of a loading pin actuator arrangement in the direction of the joining element holding device. The loading pin arrangement is here designed to variably establish a loading pin stroke of the loading pin between at least two stages, so that in a first stage the loading pin is displaceable less far in the direction of the joining element holding device than in a second stage.

20 Claims, 2 Drawing Sheets

(56) References Cited

U.S. PATENT DOCUMENTS

2005/0023252 A1* 2/2005 Sakoda ................. B23K 9/206
219/98

FOREIGN PATENT DOCUMENTS

| JP | 60221181 A | * 11/1985 | ............. B23K 9/202 |
| JP | 63040678 A | 2/1988 | |

* cited by examiner

JOINING APPARATUS AND METHOD FOR LOADING A JOINING ELEMENT

CROSS-REFERENCE TO RELATED APPLICATION

This application claims priority from German Patent Application No. 102016112372.2, filed on Jul. 6, 2016, the disclosure of which is incorporated herein by reference.

BACKGROUND OF THE INVENTION

The present invention relates to a joining apparatus for joining joining elements onto workpieces, comprising a joining element holding device, which is configured to radially hold a joining element, and comprising a loading pin arrangement, which is configured to slide a joining element axially into a holding position in the joining element holding device, and/or to axially support the joining element during a joining process, wherein the loading pin arrangement has a loading pin, which is slidable by means of a loading pin actuator arrangement in the direction of the joining element holding device.

In addition, the present invention relates to a method for loading a joining element into a joining element holding device of a joining apparatus, in particular of the type previously described, wherein the joining apparatus has a loading pin which is alternately transferable into a feed position and into a joining position.

In the field of joining apparatuses which are configured to join joining elements onto workpieces, for instance by way of so-called stud welding or by way of stud gluing, etc., it is known to feed joining elements in an automated manner to a joining head or a joining gun.

On the joining head is provided a holding device, at which a joining element is held radially or on its outer periphery. In stud welding, a welding current can be conducted into the joining element via a holding apparatus of this type. The holding apparatus therefore generally has a high radial clamping force.

In joining apparatuses of this type, the feeding is effected such that joining elements are introduced by means of a joining element receiver from radially into an axial feed channel, via which joining elements are fed from the rear into the holding apparatus. The joining elements then come to rest in the region of the holding apparatus, since they are braked by clamping jaws of the holding apparatus. After this, a loading pin is forced by means of a loading pin actuator out of a feed position, in which the feed channel is freed, from the rear against the joining element, in order to press the latter into a holding position in the joining element holding device. The position of the loading pin can then be maintained during the joining process in order to axially support the joining element during such a process.

As the loading pin actuator, a pneumatic cylinder, which is transferable between two axial positions in a manner which is known per se, is frequently used.

In the holding position, the joining elements generally protrude in relation to an axial end of the holding apparatus. Joining elements of different length can therefore protrude by different distances in relation to the axial end of the holding apparatus. The different lengths of joining elements are herein limited, however.

Document DE 100 18 239 C1 discloses a welding shaft for a stud welding head, wherein a loading pin is manoeuvrable by means of a drive mechanism into a plurality of end positions by means of a spindle arrangement, in order to load parts of different length which are to be welded together.

Document DE 10 2005 009 950 A1 discloses a stud welding device in which, instead of a rigid loading pin, there is provided a flexible loading pin, which is mounted for guidance purposes on a circular track so as thereby to be able to work different-sized studs with a welding device.

BRIEF SUMMARY OF THE INVENTION

Against this background, it is an object of the invention to define an improved joining apparatus, and an improved method for loading a joining element into a joining element holding device of a joining apparatus.

The above object is achieved in the joining apparatus stated in the introduction by virtue of the fact that the loading pin actuator arrangement is designed to variably establish a loading pin stroke of the loading pin between at least two stages, so that in a first stage the loading pin is displaceable less far in the direction of the joining element holding device than in a second stage.

In contrast to the prior art, it is hence proposed not to be able to bring the loading pin steplessly into different positions, but rather to be able to transfer the loading pin into at least two specific different joining positions.

It is here of particular benefit if the loading pin actuator arrangement is a pneumatic loading pin actuator arrangement.

A loading pin arrangement of this type can be realized in a constructively comparatively simple and cost-effective manner. In particular, preferably no position sensors are necessary to establish the different stages of the loading pin stroke.

It is here possible to slide into the holding position of the joining element holding device joining elements which have markedly different lengths. For instance, these can, on the one hand, be studs having a length of 14 mm and, on the other hand, ball studs having a diameter of 6.35 mm.

In a further variant, studs of different length can be worked, for instance studs having a length of 10 mm or studs having a length of 30 mm. The difference between the two stages of the loading pin stroke can here range from 2 mm to 50 mm, in particular range from 5 mm to 25 mm.

In the method according to the invention, the joining apparatus hence has a loading pin which is alternatively transferable into a feed position, into a first joining position and into at least a second joining position, with the step of detecting whether a supplied joining element has a first axial length or a second axial length, and with the further step of displacing the loading pin into the first joining position if the supplied joining element has the first axial length, or displacing the loading pin into the second joining position if the supplied joining element has the second axial length.

The detection of whether the joining element has a specific axial length can here relate to specific axial lengths. In this case, only two different joining elements, for instance, are joined by means of the joining apparatus.

Obviously, however, the detection of whether a supplied joining element has a specific axial length includes detecting whether the supplied joining element has an axial length within a specific axial length range. For instance, joining elements having very many different axial lengths can thereby be joined, wherein the joining elements are then divided into two groups, a first group, in which the loading pin is transferred into the first joining position, and a second group, in which the loading pin is transferred into the second joining position.

The loading pin actuator arrangement is, as stated, preferably a pneumatic loading pin actuator arrangement, with which at least two, in particular precisely two, defined joining positions can be established. The transport speed in the loading pin actuator arrangement can be definedly set, at least in one direction, by means of outlet air restrictors.

A loading pin cylinder can be supplemented by a guide system, whereby distortion can be avoided.

The object is thus fully achieved.

It is of particular benefit if the loading pin is coupled with a loading pin piston of a loading pin cylinder which defines a first piston stroke for the loading pin piston.

The loading pin can here preferably pass through an axial end of the loading pin cylinder, so that sealing is easily possible.

According to a preferred embodiment, the loading pin piston is here displaceable in a first cylinder chamber of the loading pin cylinder.

The loading pin actuator arrangement preferably has two sealed cylinders arranged one behind the other, which are connected in series in order thereby to be able to set two defined joining positions.

It is of particular benefit overall if the above-described loading pin cylinder is displaceable on a housing of the loading pin arrangement, by means of a second piston, between at least two different axial positions.

It is hereby possible to achieve in a constructively simple manner that a second piston stroke, which, for the establishment of a—first—loading pin stroke, can be added onto the first piston stroke or is not incorporated in the—second—loading pin stroke, is established by means of the second piston.

It is here of particular benefit if the second piston is fixed in relation to the housing.

Here, a piston rod of the second piston preferably extends through a further, opposite axial end of the loading pin cylinder and is connected to the housing.

The piston rod of the second piston hence likewise extends axially through a cover arrangement of the loading pin cylinder and can hence be easily sealed.

All in all, it is further advantageous if the second piston is displaceable in a second cylinder chamber of the loading pin cylinder.

In this case it is possible to establish the two stages by means of a single cylinder, in which two pistons are displaceable.

In this respect, it is of particular benefit if a loading pin piston coupled with the loading pin and the second piston have the same diameter.

In addition, it is herein advantageous if a first cylinder chamber, in which a loading pin piston coupled with the loading pin is displaceable, and a second cylinder chamber, in which the second piston is displaceable, are mutually separated by a partition.

This makes it possible to define in a loading pin cylinder two mutually separated cylinder chambers. These two cylinder chambers can in this way be established in a constructively simple manner. In addition, outlet air restrictors can be integrated in a simple manner into both cylinder chambers. Also the supply of compressed air is easily realizable. In particular, the two cylinder chambers can respectively be subjected to same pressure levels, so that it is not necessary to provide compressed air with more than two different pressures (for instance a relief pressure of 0 bar, for instance, and a loading pressure >0).

It is here further of advantage if the loading pin arrangement is configured such that, in a feed position of the loading pin in which the loading pin frees a feed channel for a joining element which is to be fed into the joining element holding device, the loading pin piston and the second piston are disposed adjacent to the partition.

In other words, a first and a second cylinder chamber are mutually separated in the feed position by the pistons and the intervening partition.

In a further embodiment, it is advantageous if a variable cylinder chamber is arranged between a loading pin piston coupled with the loading pin and the second piston.

In this case, different axial positions of the loading pin piston and of the second piston can be effected by the setting of different pressures in the various cylinder chambers. In this embodiment, the formation of a partition between the pistons is not necessary.

In elongate joining elements in the form of studs, the holding position within the holding apparatus axially with comparatively large tolerance is acceptable. Insofar as the joining elements, however, are configured in the form of joining balls, for instance, it is advantageous if the axial holding position of such a joining ball is adjustable within the holding apparatus precisely and with narrow tolerances.

In this case, it is of particular benefit if the loading pin arrangement has, for the second stage of the loading pin stroke, a stroke fine adjustment device.

Obviously, the loading pin arrangement in a further alternative embodiment can have, at least for the first stage of the loading pin stroke, a stroke fine adjustment device.

In this embodiment, the loading pin stroke can hence be precisely adjusted via the fine adjustment device.

It is here of particular benefit if a loading pin cylinder is axially displaceable on a housing of the loading pin arrangement, wherein a stroke-limiting stop between the housing and the loading pin cylinder has a screwing element.

A screwing arrangement of this type can be easily used to realize a stroke fine adjustment device.

The above invention is further achieved by a loading pin arrangement of a joining apparatus of the type described above.

Obviously the above-stated features and the features yet to be described below are usable not only in the respectively stated combination, but also in other combinations or in isolation, without departing from the scope of the present invention.

BRIEF DESCRIPTION OF THE SEVERAL VIEWS OF THE DRAWINGS

Illustrative embodiments of the invention are represented in the drawing and explained in greater detail in the following description, wherein.

DETAILED DESCRIPTION OF THE PREFERRED EMBODIMENTS

Figure 1:
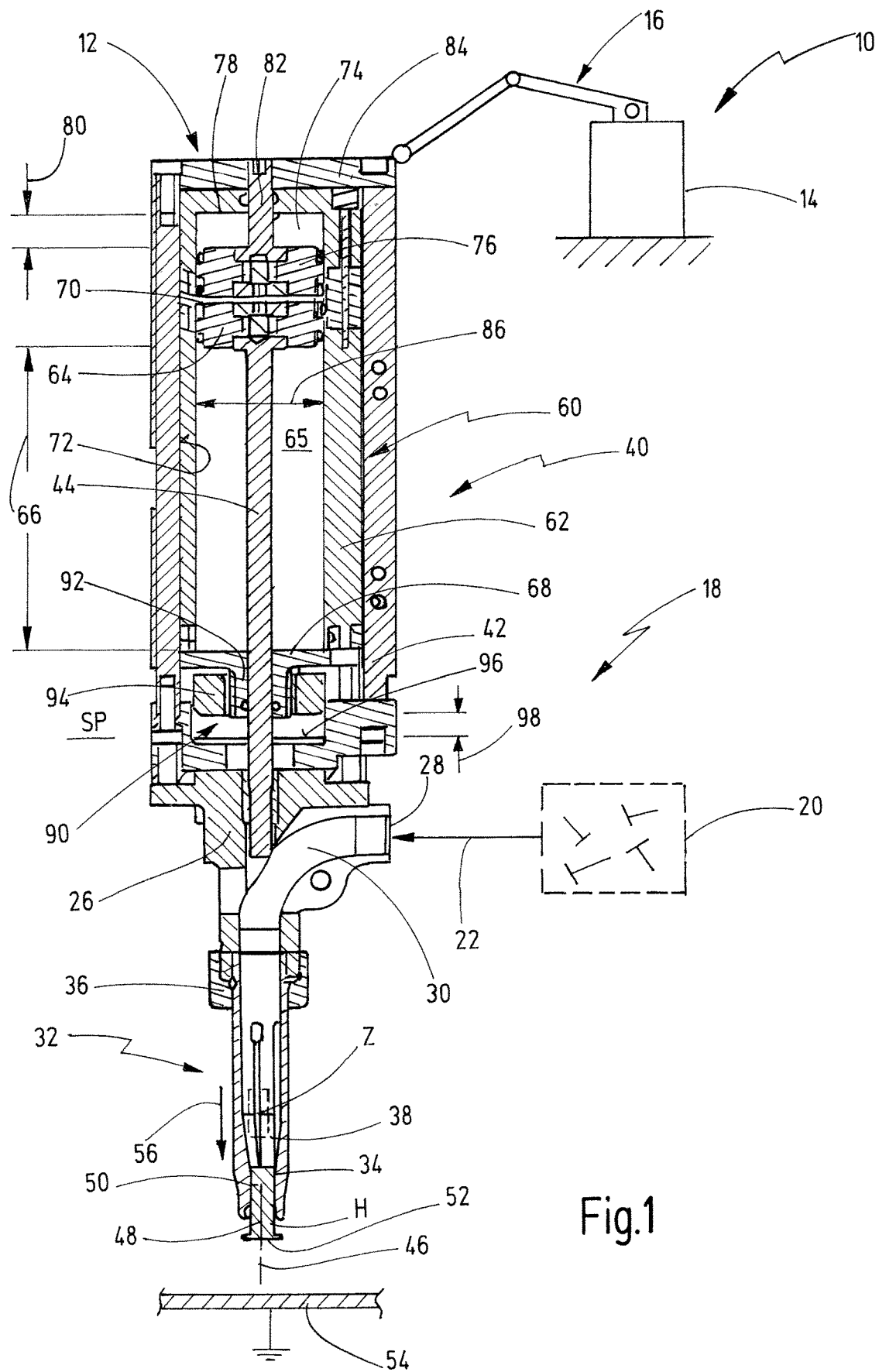
FIG. 1 shows a schematic representation of a joining system comprising an embodiment of a joining apparatus according to the invention, wherein a loading pin is in a feed position.

In FIG. 1, a joining system for joining joining elements onto workpieces is represented schematically and denoted in general terms by 10.

The joining system 10 has a joining head 12, which forms a joining apparatus. The joining head 12 is movable three-dimensionally in space, by way of example by means of a robot 14, wherein the joining head 12 is guided on one end of an arm 16 of the robot 14.

The joining system 10 further contains a feed device 18. The feed device 18 has a separating device 20, in which the joining elements 48 are separated and are then conveyed via a feed system, for instance in the form of blow air, via a feed tube 22 to the joining head 12.

The joining head 12 contains a joining element receiver 26, which contains an inlet opening 28, via which separated joining elements 48 are fed. The inlet opening 28 is connected via a feed channel 30 to a joining element holding device 32 of the joining head 12. The joining element holding device 32 has a plurality of holding tongues 34 arranged distributed over the periphery. The joining element holding device 32 is connected to the joining element receiver 26 by means of a fastening system in the form of a cap nut 36.

The holding tongues 34 define a conical portion 38, which passes from an inner diameter, which corresponds to a maximum diameter of a joining element, to an inner diameter, which is smaller than a minimum diameter of the joining elements to be worked.

The feed channel 30 extends from the inlet opening 28 in a curved path out of a radial feed direction into an axial feed direction and is connected to the rear end of the joining element holding device 32 in order hence to be able to feed joining elements via the feed channel 30 from the rear into the joining element holding device 32, until these come to a halt in the region of the conical portion 38 in the joining element holding device 32.

In order to transfer a thus supplied joining element subsequently into a holding position, which in FIG. 1 is shown schematically at H, a loading pin arrangement 40 is provided.

The loading pin arrangement 40 contains a housing 42, which is fixedly connected to the joining element receiver 26. In addition, the loading pin arrangement 40 has a loading pin 44, which extends along a joining axis 46, i.e. coaxially to the holding device 32. The loading pin 44 is movable between a feed position SP and two joining positions.

In FIG. 1, the loading pin 44 is shown in the feed position SP. In this, the loading pin 44 is so far withdrawn from the joining element holding device 32 in the axial direction that it frees with its front end the feed channel 30, so that a joining element can be freely conveyed from a side of the loading pin 44 into the holding device 32.

Figure 2:
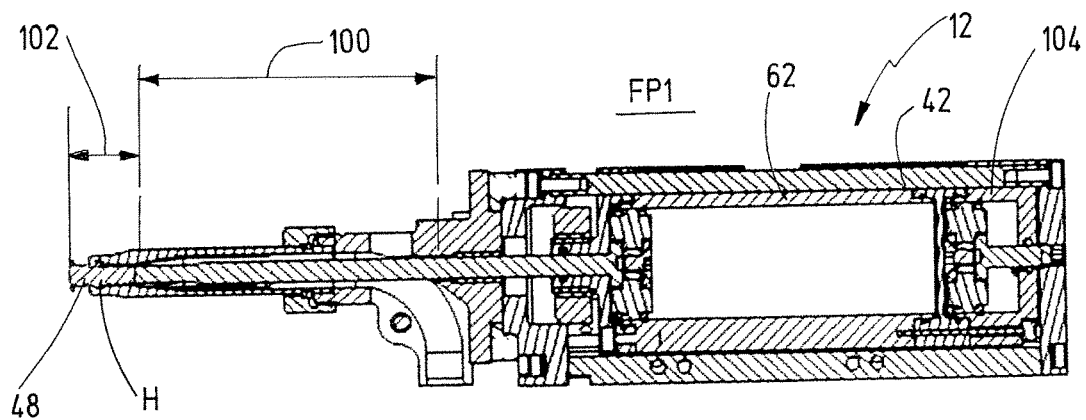
FIG. 2 shows the joining apparatus of FIG. 1, wherein a loading pin is in a first joining position.
Figure 3:
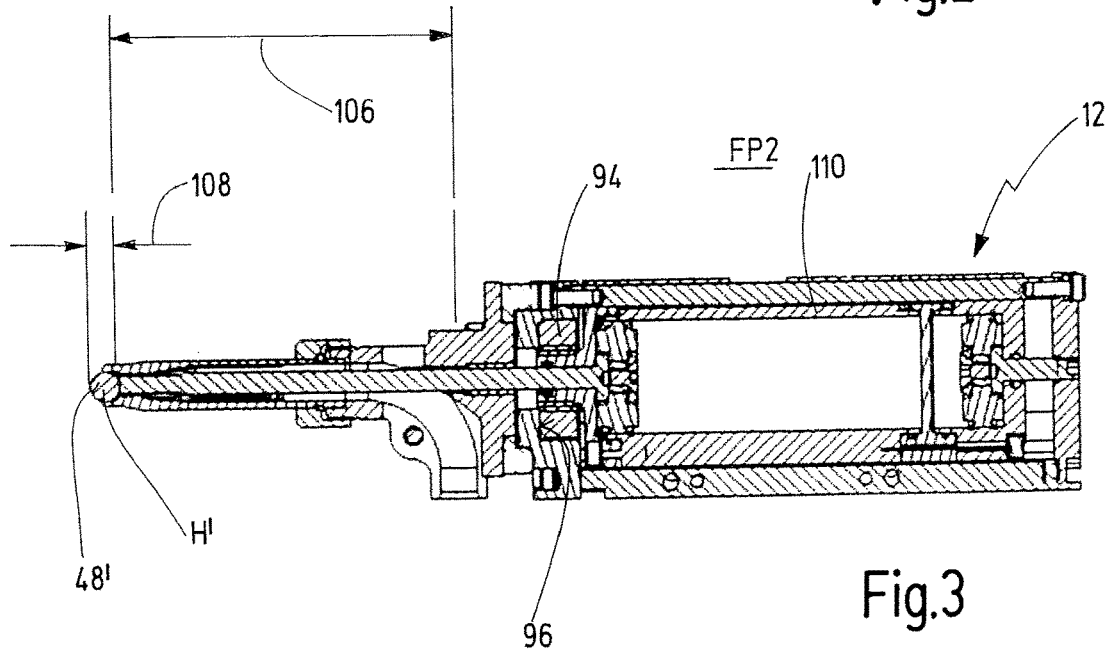
FIG. 3 shows the joining apparatus of FIG. 1, wherein a loading pin is in a second joining position.

After this, the loading pin 44 can be transferred into one of the joining positions shown in FIGS. 2 and 3. As a result, a joining element 48 is pressed from the rear further into the joining element holding device 32 and finally into a holding position H, in which a part of the joining element 48 protrudes in relation to an axial end of the holding device 32, as is represented in FIG. 1.

In FIG. 1 is shown that the joining element 48 has a shank portion 50, which in the holding position H is held on the outer periphery by the holding tongues 34, and a flange portion 52, which in the holding position H protrudes axially in relation to the holding device 32.

For the performance of a joining operation, the flange portion 52 can then be mounted onto a workpiece 54 such as a metal sheet. After this, a welding current 56 can be conducted into the holding device 32, so that an electric current flows from the joining element 48 into the workpiece 54. Next the joining element 48 can be lifted off the workpiece 54 in order to draw an arc which fuses the mutual joining surfaces, after which the joining element 48 can be lowered onto the workpiece 54 in order to end the stud welding operation. The welding current is then short-circuited and shut off.

The movements of the joining element 48 can here be effected by movements of the joining head 16 as a whole, either via a motor (not described in detail) on the joining head, or directly by means of the robot 14.

Instead of a welding operation, a gluing operation or another joining operation can also be performed, however, with a joining apparatus according to the invention.

In order to move the loading pin 44 between the feed position SP shown in FIG. 1 and one of the two joining positions FP1 and FP2 which are represented in FIGS. 2 and 3 respectively, a loading pin actuator arrangement 60 is provided.

The loading pin actuator arrangement 60 has a loading pin cylinder 62, within which a loading pin piston 64 is disposed, to be precise within a first cylinder chamber 65 of the loading pin cylinder 62. The first cylinder chamber 65 defines a first piston stroke 66 for the loading pin cylinder 62.

The loading pin itself or a therewith associated piston rod passes through a first axial end 68 of the loading pin cylinder 62 and is sealed at this place. The first cylinder chamber 65 is delimited by this first axial end 68 and by a partition 70 within the loading pin cylinder 62.

The loading pin cylinder 62 itself is mounted in an axial displaceable manner within a bore 72 of the housing 42.

Within the loading pin cylinder 62 is established a second cylinder chamber 74, which extends between the partition 70 and a second axial end 78 of the loading pin cylinder 62. Within the second cylinder chamber 74 is disposed a second piston 76, which is rigidly connected to the housing 42 via a second piston rod 82 (not described in detail) which passes rough the second axial end 78.

The second cylinder chamber 74 is hence delimited by the partition 70 and by the second axial end 78 and establishes a second piston stroke 80, which is preferably smaller than the first piston stroke 66.

As illustrated, the second piston 76 is connected to the housing 42 via the second piston rod 82, which passes through the second axial end 78. The second piston rod 82 is here fixed to an end cap 84 of the housing 42, which closes off an opening via which the loading pin cylinder 62 can be introduced into the bore 72 of the housing 42.

A diameter of the cylinder chambers 65, 74 is shown in FIG. 1 at 86. The diameters are identical.

In the feed position SP, the second axial end 78 bears against the end cap 84. In addition, the pistons 64, 76 bear against opposite axial sides of the partition 70.

The axial mobility of the loading pin cylinder 62 within the housing 42 is adjustable via a fine adjustment device 90.

The fine adjustment device 90 has a screw bolt 92, which protrudes from the first axial end 68 of the loading pin cylinder 62 in the direction of the holding device 32. Onto the screw bolt 92 is screwed a nut 94. The nut 94 can here form a stroke-limiting stop in relation to a stop face 96 of the housing 42.

Hence a loading pin cylinder stroke 98 can be finely adjusted by twisting of the nut 94, which forms a screwing element. The loading pin cylinder stroke 98 is here preferably smaller than/equal to the second piston stroke 80.

Starting from the feed position SP shown in FIG. 1, a first joining position FP1 can be established, as is represented in FIG. 2. To this end, compressed air is fed between the partition 70 and the loading pin piston 64, so that the loading pin piston is displaced to the fore in the measure of the first piston stroke 66, such that a front end of the loading pin 44 presses a joining element 48, such as the stud shown in FIG. 2, out of a position within the holding device 32 into the holding position H shown in FIG. 1 and FIG. 2.

During the joining process, the loading pin can remain in the position to axially support the joining element.

The hereby established first loading pin stroke 100 is preferably identical to the first piston stroke 66.

This first loading pin stroke 100, corresponding to the first joining position FP1, is established when a joining element 48 has a first joining element length 102 which can lie within a specific first joining element length range.

The position of the loading pin cylinder 62 within the housing 42 here remains unaltered in relation to the feed position SP shown in FIG. 1 and is shown schematically in FIG. 2 at first axial position 104.

Insofar as a joining element 48' having a second joining element length 108 which is smaller than the first joining element length 102 and which can lie within a second joining element length range is to be joined, such as, for instance, the spherical joining element 48' shown in FIG. 3, the second stage of the loading pin actuator arrangement 60 is activated, in which stage compressed air is fed into the region between the partition 70 and the second piston 76, whereby the loading pin cylinder 62 is transferred out of the first axial position 104 shown in FIG. 2 into the second axial position 110 shown in FIG. 3, which latter position is established by the fine adjustment device having the nut 94 and the stop face 96.

The hereby established second loading pin stroke 106 is larger than the first loading pin stroke 100.

Figure 4:
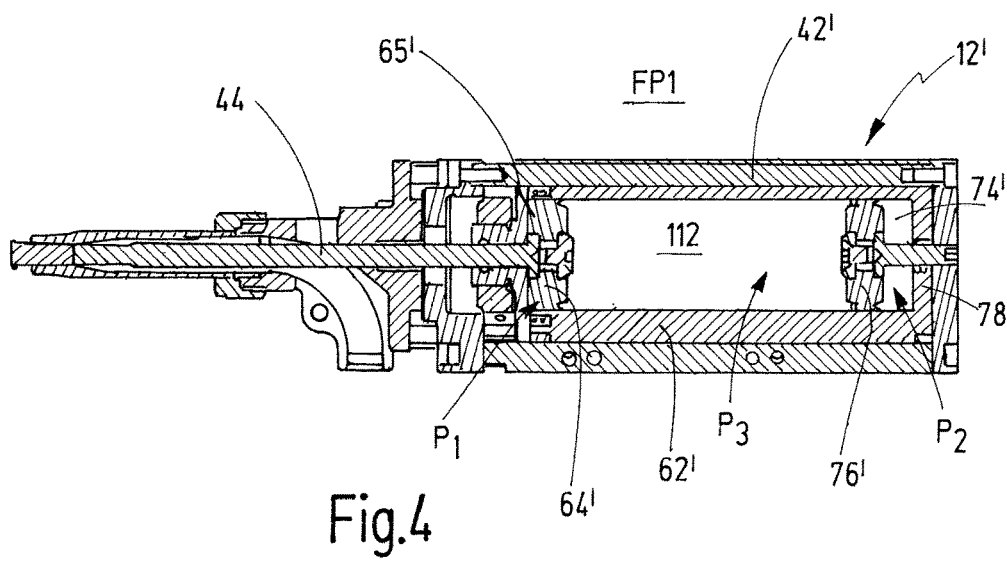
FIG. 4 shows an alternative embodiment of a joining apparatus, wherein a loading pin is in a first joining position.

In FIG. 4 is represented an alternative embodiment of a joining apparatus 12' located within housing 42', which in terms of structure and working method corresponds generally to the joining apparatus 12 of FIGS. 1 to 3. Same elements are therefore identified by same reference symbols. The differences are substantially set out below.

In contrast to the joining apparatus of FIGS. 1 to 3, the loading pin cylinder 62 has no partition between the loading pin piston 64 and the second piston 76. The ranges of movement of these pistons can be established in the same way as in the embodiment of FIGS. 1 to 3.

For the establishment of the first joining position FP1, which is shown in FIG. 4, a first cylinder chamber 65' between the loading pin piston 64' and that axial end of the loading pin cylinder 62' which is facing the loading pin 44 is pressureless ($P_1=0$). In the further second cylinder chamber 74' between the second piston 76' and that axial end of the loading pin cylinder 62' which is facing away from the loading pin 44 is contained fluid with a pressure $P_2$.

Finally, in a variable cylinder chamber 112 which is present between the pistons 64', 76' a pressure $P_3$ is present. In the first joining position FP1, $P_2$ is greater than $P_3$. When the second joining position FP2 is due to be established, the second cylinder chamber 74' is pressurelessly connected, so that the loading pin cylinder 62' is transferred still further to the left in relation to the position shown in FIG. 4 until the second axial end 78 of the loading pin cylinder 62' butts against the second piston 76'.

Thus in the first joining position FP1: $P_2 > P_3 > P_1$.

In the second joining position FP2: $P_3 > P_1$ AND $P_3 > P_2$.

In the feed position (corresponding to FIG. 1), the following applies:

$P_2 > P_1 > P_3$.

The said pressures apply to uniform impact surfaces or cross sections of the respective cylinder chambers. Insofar as the impact surfaces are different, the pressures shall be adapted accordingly.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A joining apparatus for joining a joining element onto workpieces, the joining apparatus comprising:
   a joining element holding device, which is configured to radially hold the joining element; and
   a loading pin arrangement including a loading pin actuator arrangement and a loading pin with a front end, wherein the loading pin-is slidable by means of the loading pin actuator arrangement in the direction of the joining element holding device, and wherein the loading pin arrangement is operable to establish one of a first loading pin stroke and a second loading pin stroke, and the first loading pin stroke is in the direction of the joining element holding device from a feed position to a first joining position, while the second loading pin stroke is from the feed position to a second joining position, and wherein the first loading pin stroke is less long than the second loading pin stroke and the front end of the loading pin is displaceable less far in the direction of the joining element holding device than in the second loading pin stroke; and
   wherein the loading pin arrangement further includes a housing and the joining element holding device is axially fixed relative to the housing; and
   wherein the loading pin actuator arrangement includes:
      a loading pin cylinder located in and axially displaceable within the housing of the loading pin arrangement, the loading pin cylinder includes a first cylinder chamber and a second cylinder chamber, and a partition divides the loading pin cylinder into the first cylinder chamber and the second cylinder chamber;
      a first piston coupled with a rear end of the loading pin and is displaceable in the first cylinder chamber of the loading pin cylinder which defines a first piston stroke; and
      a second piston is located in the second cylinder chamber of the loading pin cylinder.

2. The joining apparatus according to claim 1, wherein the second piston is fixed in relation to the housing.

3. The joining apparatus according to claim 1, wherein the first piston and the second piston have the same diameter.

4. The joining apparatus according to claim 1,
   wherein the loading pin arrangement is configured such that, in the feed position (SP) of the loading pin, in which the loading pin frees a feed channel for the joining element which is to be fed into the joining element holding device, the first piston and the second piston are disposed adjacent to the partition.

5. The joining apparatus according to claim 1, wherein the loading pin arrangement includes a stroke fine adjustment device.

6. The joining apparatus according to claim 5, wherein the stroke fine adjustment device includes a nut as a screw adjustable stroke-limiting stop between the housing and the loading pin cylinder.

7. A joining tool for joining a fastener onto a workpiece, the joining tool comprising:

a housing defining a bore with a longitudinal axis and including a first end and a second end opposed to the first end;

a receiver fixedly connected to the housing at the first end and including:
   a joining element holding device including a plurality of holding tongues arranged around a joining axis; and
   an inlet opening through which the fastener is fed radially inward then axially downward via a feed channel to the joining element holding device;

a loading pin extends inside the housing along the joining axis coaxially to the joining element holding device and is movable along the joining axis from a feed position to a first joining position or a second joining position; and a loading pin actuator including:
   a loading pin cylinder mounted in and axial displaceable within the bore of the housing and including a first axial end, proximate to the joining element holding device, and a second axial end, distal from the joining element holding device;
   a partition transverse to the joining axis divides the loading pin cylinder into a first chamber, proximate to the joining element holding device, and a second chamber distal from the joining element holding device;
   a first piston is disposed within the first chamber of the loading pin cylinder and is connected to and axially movable with the loading pin which extends into the loading pin cylinder through the first axial end; and
   a second piston is disposed within the second chamber and is connected to the second end of the housing via a piston rod which extends through the second axial end of the loading pin cylinder.

8. The joining tool according to claim 7 wherein the first cylinder chamber defines a first piston stroke and the second cylinder chamber defines a second piston stroke, which is smaller than the first piston stroke.

9. The joining tool according to claim 8 wherein the loading pin cylinder moves axially within the housing a cylinder stroke distance between a first cylinder position, when the loading pin is in the first joining position, and a second cylinder position, when the loading pin is in the second joining position, and the cylinder stroke distance is adjustable.

10. The joining tool according to claim 9 wherein the cylinder stroke distance is adjustable by an adjustment screw.

11. The joining tool according to claim 9 wherein the cylinder stroke distance is no longer than the second piston stroke.

12. The joining tool according to claim 7 wherein a front end of the loading pin selectably moves from the feed position to:
   the first joining position a first loading pin stroke distance; or
   the second joining position a second loading pin stroke distance; and the second loading pin stroke distance is longer than the first loading pin stroke distance.

13. The joining tool according to claim 7, wherein in the feed position:
   the first axial end of the loading pin cylinder is spaced an axial distance from the first end of the housing;
   the second axial end of the loading pin cylinder bears against the second end of the housing;
   the first piston and second piston are proximate to respective and opposite axial sides of the partition; and
   the loading pin is withdrawn from the joining element holding device so far that it is removed from the feed channel, and the fastener can be freely conveyed from the inlet opening to the joining element holding device.

14. The joining tool according to claim 7, wherein in the first joining position:
   the first axial end of the loading pin cylinder is spaced a first axial distance from the first end of the housing;
   the second axial end of the loading pin cylinder is adjacent to the second end of the housing;
   the first piston is proximate to the first axial end of the loading pin cylinder;
   the second piston is proximate to the partition; and
   the loading pin moved from the feed position into the joining element holding device a first loading pin stroke distance.

15. The joining tool according to claim 14, wherein in the first joining position a compressed air is fed between the partition and the first piston.

16. The joining tool according to claim 14, wherein in the first joining position a front end of the loading pin presses the fastener axially out of first fastener position within the holding device into a second fastener position.

17. The joining tool according to claim 14, wherein the first cylinder chamber defines a first piston stroke, and the first loading pin stroke distance is equal to the first piston stroke.

18. The joining tool according to claim 7, wherein in the second joining position:
   the first axial end of the loading pin cylinder is adjacent to the first end of the housing;
   the second axial end of the loading pin cylinder is spaced a second axial distance from the second end of the housing;
   the first piston is proximate to the first axial end of the loading pin cylinder;
   the second piston is distal from the partition and proximate to the second axial end of load pin cylinder; and
   the loading pin moved from the feed position into the joining element holding device a second loading pin stroke distance.

19. The joining tool according to claim 18, wherein in the second joining position a compressed air is fed between the partition and the second piston.

20. The joining tool according to claim 18, wherein the second cylinder chamber defines a second piston stroke.

* * * * *